Oct. 21, 1969     E. E. WOODS     3,474,393
HIGH VOLTAGE CABLE TERMINAL
Filed Oct. 17, 1966     2 Sheets-Sheet 2
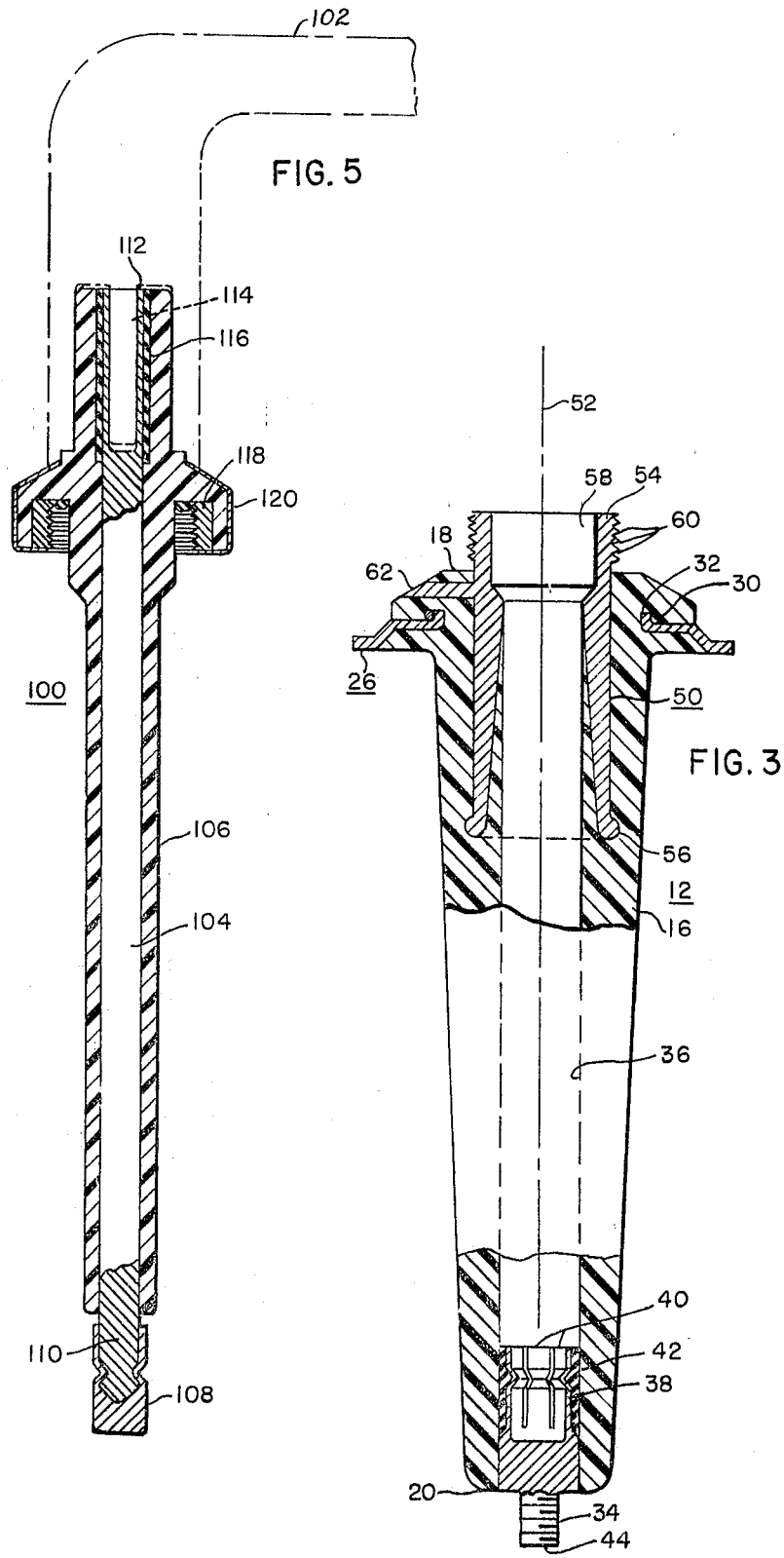

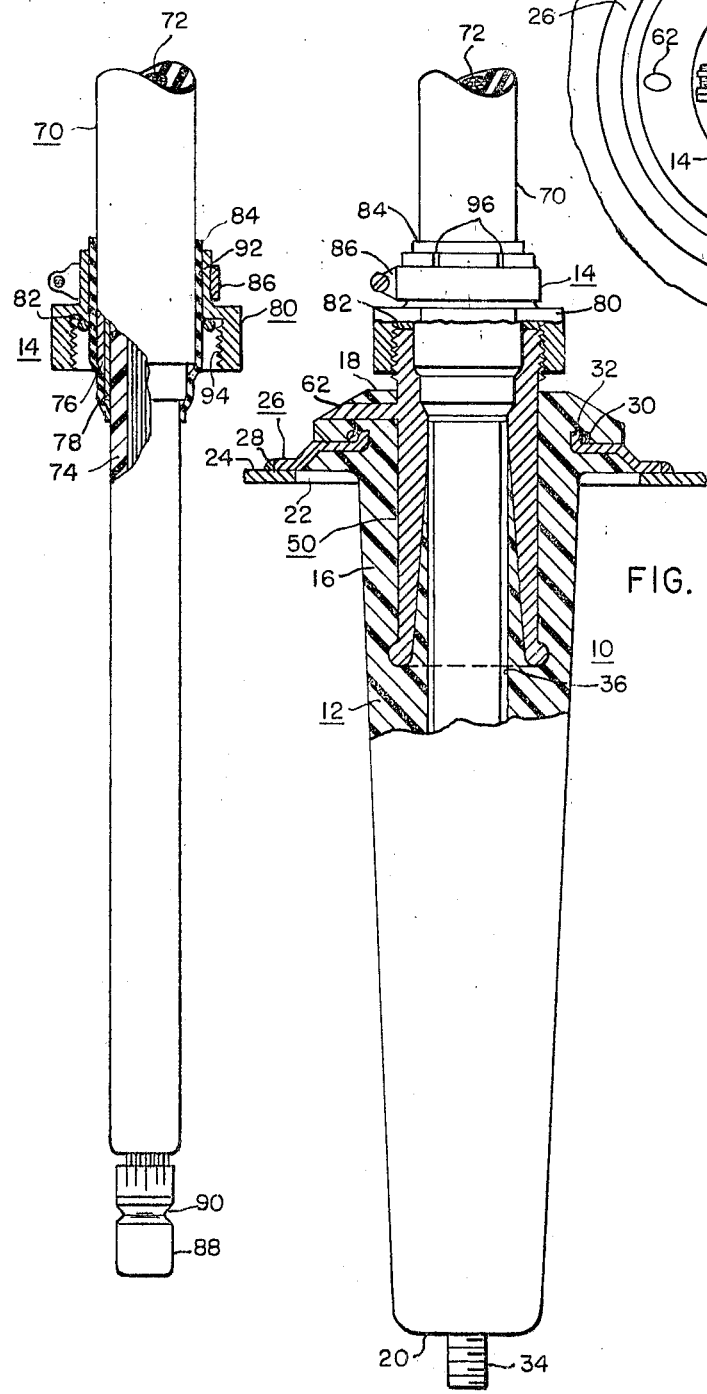

United States Patent Office 3,474,393
Patented Oct. 21, 1969

3,474,393
HIGH VOLTAGE CABLE TERMINAL
Edmund E. Woods, Sharon, Pa., assignor to Westinghouse Electric Corporation, Pittsburgh, Pa., a corporation of Pennsylvania
Filed Oct. 17, 1966, Ser. No. 587,040
Int. Cl. H01r 17/18, 13/46
U.S. Cl. 339—143
7 Claims

ABSTRACT OF THE DISCLOSURE

A plug-in high voltage shielded cable termination which includes an insulating bushing portion adapted to be mounted through an opening in the casing of electrical apparatus, and a cooperative plug-in portion which includes a specially prepared end of the shielded cable to be terminated. The insulating portion includes a tubular metallic member which cooperates with the plug-in portion to maintain the cable termination in assembled relation, which also functions as a stress cone. A resilient electrically conductive sleeve member snugly disposed about the shielded cable connects the outer conductive portion of the shielded cable to the tubular metallic member, when the insulating and plug-in portions are in assembled relation.

---

This invention relates in general to new and improved high voltage terminal means, and more specifically to means for connecting a high voltage shielded cable to electrical apparatus, such as transformers and circuit interrupting means.

The connection of high voltage shielded cable to electrical apparatus is usually accomplished by terminating the outer conductor or cable shield in a conventional stress cone formed of multiple layers of tape, and by connecting the inner conductor to a conventional electrical bushing. The lapped tape type stress cone, however, requires a considerable amount of time to construct, and its effectiveness in reducing electrical stresses at the termination of the cable shield is dependent upon the skill of the person fabricating the cone.

Further, certain types of electrical apparatus, such as underground and vault mounted electrical transformers, may be called upon to operate completely submerged in water. Therefore, it is imperative that the high voltage cable be terminated at the electrical apparatus in a completely moistureproof manner. Moistureproof low voltage bushings which may be used are disclosed in my copending application Ser. No. 556,208, filed June 8, 1966, which is assigned to the same assignee as the present application. Also, the termination should be quickly and easily performed in the field, and the effectiveness of the termination in reducing electrical stress, and the moisture resistance of the termination, should not be dependent upon the degree of skill of the field personnel.

Accordingly, it is an object of the invention to provide a new and improved high voltage cable terminal for electrical apparatus.

Another object of the invention is to provide a new and improved high voltage cable terminal for electrical apparatus which enables field personnel to quickly and easily prepare high voltage shielded cable to perform a moistureproof electrical connection to the electrical apparatus.

Still another object of the invention is to provide a new and improved high voltage cable terminal which provides the functions of terminating the cable shield with a minimum of electrical stress, passing the cable conductor through the casing of the electrical apparatus, providing a terminal within the casing of the electrical apparatus adapted for connection to the apparatus, and providing a probe contact point external to the electrical apparatus which will allow field personnel to determine if the cable is energized.

A further object of the invention is to provide a combination shielded cable termination and electrical bushing, which minimizes the buildup of electrical stress at the termination of the cable shield, and which seals the cable termination against moisture.

Briefly, the present invention accomplishes the above cited objects by providing a plug-in type high voltage cable terminal comprising an insulating portion which is mounted through an opening in the casing of electrical apparatus, and a plug-in portion which comprises a specially prepared end of the high voltage shielded cable to be terminated. The insulating portion of the cable is of the cast resin type, having a generally cylindrical, elongated cast body portion which extends between first and second ends. The insulated portion includes integral mounting means disposed between its ends, and also includes a generally cylindrical, hollow, metallic member which extends outwardly from one end of the body portion, and which is in registry with an orifice or opening which extends between the ends of the body portion. A spring type terminal is disposed at one end of the orifice, which also extends outwardly from the body portion of the insulated portion to provide means for connecting the terminal with an electrical conductor. The hollow or tubular metallic member has an outwardly extending threaded end which enables the plug-in portion of the terminal to be secured thereto, and a flared end which is embedded in the cast body portion, which provides a stress cone for terminating the cable shield with a minimum of stress.

The plug-in portion of the terminal comprises the shielded cable, which has been prepared with cable mounting and clamping means, and a semiconductive resilient sleeve member. The cable mounting and clamping means, and semiconductive resilient sleeve member, are telescoped over the end of the high voltage cable to be terminated, with the cable mounting and clamping means surrounding a portion of the semiconductive resilient sleeve member, and with the resilient sleeve member being in contact with the cable shielding conductor. When the plug-in portion of the high voltage cable terminal is inserted into the insulating portion of the terminal, the centrally disposed conductive portion of the cable, which has been bared for a predetermined length, makes plug-in contact with the spring-type terminal. Also, the resilient sleeve member contacts the hollow metallic member which functions as the stress cone. The cable mounting means is threaded onto the threaded end of the hollow metallic member, and the clamping means is secured to the cable. The integrity of the cable is preserved until the cable has passed the clamping point, in order to preserve the moistureproof characteristic of the termination. Thus, the central conductor of the high voltage cable makes contact with a conductor from the electrical apparatus within the insulating portion of the terminal, which is in turn disposed within the casing of the electrical apparatus, and the cable shield is terminated through the semiconductive resilient sleeve member to the hollow or tubular metallic member which provides the stress cone function.

A probe contact button may extend from the outer surface of the cast body portion to the hollow metallic member, which will electrostatically develop a small potential when the high voltage cable is energized. Thus, a suitable probe, when placed in contact with the probe contact button, will indicate whether or not the high voltage cable is energized. The plug-in portion of the terminal may be quickly and easily prepared in the field, providing a waterproof electrical terminal, and a highly effective termination of the cable shield, without requiring highly skilled personnel.

Further objects and advantages of the invention will become apparent from the following detailed description, taken in connection with the accompanying drawings, in which:

FIGURE 1 is an elevational view, partially in section, of a high voltage shielded cable terminal constructed according to the teachings of the invention, with the plug-in portion of the terminal shown in position relative to the insulating portion of the terminal, FIG. 2 is a plan view of the high voltage cable terminal shown in FIG. 1, FIG. 3 is an elevational view, in section, of the insulating portion of the high voltage terminal shown in FIG. 1, FIG. 4 is an elevational view, partially in section, of the plug-in portion of the high voltage terminal shown in FIG. 1, and FIG. 5 is an elevational view, in section, of an alternate plug-in portion which may be used with the insulating portion of the terminal shown in FIG. 3.

Referring now to the drawings, and FIGS. 1 and 2 in particular, there is shown elevational and plan views, respectively, of a high voltage shielded cable terminal 10, which terminates a shielded electrical cable in a sealed, moistureproof manner, terminates the shield or outer conductive portion of a high voltage shielded cable with a minimum of electrical stress, and also provides a terminal or bushing for connecting the inner conductor of the cable to electrical apparatus, such as transformers and circuit breakers. The high voltage cable terminal 10 is especially suited for use with electrical apparatus which may be flooded, or otherwise exposed to excessive moisture.

In general, high voltage cable terminal 10 includes an insulator portion 12, and a plug-in portion 14. Insulator portion 12 comprises a generally cylindrical, elongated body member 16 having first and second ends 18 and 20, respectively. Body member 16 is formed of a suitable cast resin system, such as an epoxy or polyester, and may be filled with particulated, inert filler means, such as quartz, silica, alumina trihydrate ($Al_2O_3 \cdot 3H_2O$) or a mixture of these and other suitable materials, in order to obtain a resin system which possesses superior physical properties at elevated temperatures, high thermal conductivity, excellent crack resistant characteristics, a low coefficient of thermal expansion which closely matches that of metallic inserts, and the desired non-cracking characteristics. While the resin is preferably of the thermoset type, a thermoplastic resin having a softening temperature higher than the operating temperature of the terminal, may also be used. An example of an epoxy resin system which may be used is described in detail in copending application Ser. No. 406,102, filed Oct. 23, 1964, now abandoned, and assigned to the same assignee as the present application.

Insulator portion 12, which is shown in cross-section in FIG. 3, is disposed through an opening 22 in the casing 24 of electrical apparatus, and includes flange means 26 disposed intermediate the ends of body member 16. Flange means 26 may be a metallic flange member which is embedded in body member 16 at the time of casting, and which is welded to the casing 24 as shown at 28, in FIG. 1. A resilient gasket member 30 may also be cast into body member 16, adjacent a projection 32 on flange means 26, to insure that a seal will be maintained between flange means 26 and body member 16, even if the adhesion between flange means 26 and body member 16 is broken by the welding heat. Of course, other suitable means which has sufficient strength to withstand short circuit forces may be used to secure insulator portion 12 relative to an opening in the casing of electrical apparatus. For example, flange means 26 may have a plurality of openings therein which are aligned with similar openings in casing 24, and secured with nut and bolt combinations. Further, the flange means may be an integral part of body member 16, being formed of the cast resin system and having openings therein for receiving bolts. Also, the portion of body member 16 adjacent flange means 26 may be threaded, and a conventional spring-grip type nut used to secure flange means 26 against casing 24, through suitable gasket sealing means.

In addition to flange means 26 for mounting insulator portion 12 of high voltage cable terminal 10, insulator portion 12 includes electrical terminal means 34 which provides the functions of receiving the inner electrical conductive portion of the high voltage cable, and of providing a connection point to which an electrical conductor from the associated electrical apparatus may be connected.

Body member 16 has an opening or orifice 36 extending between its ends 18 and 20, with terminal means 34 being disposed coaxially with opening or orifice 36, which that it seals the opening at end 20 of the body member. Terminal means 34 may be cast in position at the time that body portion 16 is cast.

Terminal means 34 is formed of an electrically conductive material, and includes a tubular extension 38 for receiving in plug-in fashion the inner conductor of the high voltage cable. The tubular extension 38 has a plurality of fingers 40 which may be formed by slotting its wall portion, in order to form a spring-like socket which insures good electrical contact between fingers 40 and the high voltage cable conductor. Fingers 40 may have a slight radius or inward projection near one end thereof, which reduces the inner diameter of tubular portion 38 slightly. This provides an interference fit with the contact on the plug-in portion 14, as will hereinafter be described, which allows the fingers to "snap" into a mating groove on this contact, and securely hold the two mating parts in the proper assembled relation. The radius fingers 40 also provides a "feel" which will notify the operator when the electrical connection has been made.

If terminal means 34 is inserted into body member 16 after body member 16 has been cast, fingers 40 may be suitably spaced from the adjacent wall portion of body member 16, in order to allow the fingers to flex when the plug-in portion is inserted therein. If means 34 is cast into body member 16, a resilient sleeve 42 may be disposed about the fingers, which will prevent the resin system from flowing next to the fingers and into the slots, and which will allow the fingers to flex when the plug-in contact is engaged with the fingers, and removed therefrom. Terminal means 34 also has an outwardly projecting portion 44, which extends outwardly from body member 16, and which is adapted for connection to an electrical conductor. Portion 40 may be threaded as shown in FIGS. 1 and 3, if desired.

Insulator portion 12 also includes tubular metallic means 50, which is disposed at the first end 18 of body member 16, with the tubular opening in metallic means 50 being disposed coaxially with the axis 52 of orifice 36. Tubular metallic means 50 provides the functions of controlling and grading the electrical stress at the termination of the cable shield, providing mounting means to which plug-in portion 14 is secured, providing means which cooperates in sealing the complete electrical terminal 10, and providing a probe contact button which may be used to determine if the high voltage shielded cable is energized. Suitable probes which may be used for this function are disclosed in copending application Ser. No. 489,339, filed Sept. 22, 1965, which is assigned to the same assignee as the present application.

Tubular metallic means 50 has first and second ends 54 and 56, which are connected by a central opening 58. The central opening 58 of tubular metallic means 50 is aligned with the orifice 36 in body member 16, thus forming one continuous opening which provides access to electrical terminal means 34 from the first end 18 of body member 16.

The first end 54 of tubular metallic means 50 extends outwardly from the first end 18 of body member 16, and is threaded as shown at 60, for threadably engaging plug-in portion 14.

The second end 56 of tubular metallic means 50 is embedded in body portion 16, and as shown in FIGS. 1 and 3, the inner diameter of tubular metallic means 50 uniformly or smoothly decreases from the second end 56 inward, resulting in a flared cross-section, in which the inner diameter flares outwardly as it approaches end 56 of tubular metallic means 50. End 56 is given a generous radius, in order to avoid terminating the shielded portion of the cable with sharp edges.

When plug-in portion 14 is disposed in assembled relation with insulator portion 12, as shown in FIG. 1, tubular metallic means 50 will encircle and be spaced from the inner electrical conductor of the plug-in portion, and will thus develop a potential through electrostatic or capacitive relationships. This electrostatically developed potential may be utilized to determine if the high voltage cable is energized, by a metallic probe contact button 62, which is electrically connected to tubular metallic means 50. Contact button 62 may be embedded in body portion 16. The potential of tubular metallic means 50 increases through capacitive relationships, due to the connection of tubular metallic means 50 to the cable shield through semiconductive means, as will hereinafter be described. A direct electrical connection between the cable shield, which is grounded, and tubular metallic means 50, may not insure the buildup of an electrostatic potential of sufficient magnitude to indicate the energization of the inner conductor.

Plug-in portion 14, shown in FIGS. 1 and 4, comprises shielded cable 70, locking or mounting means 80, sealing gasket 82, a resilient sleeve member 84, clamping means 86, and electrical contact 88.

Shielded cable 70 may be of any conventional construction, having an inner electrical conductor 72 which is formed of copper or other good electrical conductor, electrical insulating means 74 disposed as a tight fitting layer about electrical conductor 72, and an outer electrically conductive shield or jacket 76 formed of a suitable electrically conductive material. In some instances, shielded cable 70 will have a layer of semiconductive means 78, such as semiconductive tape, disposed between outer jacket 76 and insulating means 74.

The shielded cable 70 utilized to form the plug-in portion of the high voltage terminal 10 is the same shielded high voltage cable utilized to transmit electrical power to the electrical apparatus, and it may be prepared in the field to form its part of plug-in portion 14.

Shielded cable 70 is prepared for the termination merely by removing a predetermined length of outer jacket 76 adjacent the end to be connected to the electrical apparatus, removing a shorter predetermined length of the semiconductive material 78, if used, to allow the semiconductive material 78 to extend past the outer jacket for approximately ½ inch, and removing a predetermined length of electrical insulation 74, such as 1 inch, to expose or bare the inner conductor 72.

Electrical contact 88 is partially tubular in cross-section, having an opening which is telescoped over the end of the bare electrical conductor 72. Electrical contact 88 is crimped or otherwise securely fastened to electrical conductor 72, to provide a good electrical and mechanical connection. The tubular portion of electrical contact 88 has an inside diameter which is substantially the same as the outside diameter of electrical conductor 72, and an outside diameter which is determined by the inside diameter of the tubular portion 38 of electrical terminal means 34, which is associated with insulator portion 12. Electrical contact 88 may have an annular groove 90 disposed about its outer surface, which cooperates with the radius on the extending fingers 40 of terminal means 34, to "lock" electrical contact 88 in position within terminal means 34, and provide the necessary feel or snap action which will indicate when the connection has been properly made.

The resilient sleeve member 84 has an inside diameter which allows it to be telescoped snugly over cable 70, and to encompass a portion of the cable shield or outer jacket 76, the exposed semiconductive material 78, and a portion of the electrical insulation 74. The resilient sleeve member 84 should be partially conductive, or semiconductive, in order to provide the function of connecting outer jacket 76 and semiconductive material 78 to tubular metallic means 50, which thus terminates the cable shield to the stress cone portion of tubular metallic means 50. Resilient sleeve member 84 may also be used to allow different cable sizes to be accommodated, by changing the wall thickness of the sleeve to provide a snug fit between locking or mounting means 80 and the shielded cable 70.

Resilient sleeve member 84 should preferably have true semiconductive characteristics, i.e., a voltage dependent resistivity. This may be accomplished by impregnating rubber, or other suitable resilient material, with particulated silicon carbide, or other particulated semiconductive materials. If resilient sleeve member 84 is semiconductive, it will automatically adjust its resistivity according to the magnitude of the electrical stress, being an excellent conductor in areas of high stress, and a poor conductor in areas of low stress, to aid in grading the electrical stress at the termination of the cable shield. Resilient sleeve member 84, however, may be formed of a partially conductive material whose resistance is not voltage dependent, if desired.

Locking or mounting means 80 provides the function of cooperating with tubular metallic means 50 to mount the plug-in portion 14 relative to insulator portion 12, and to compress gasket means 82 to seal the electrical connection. Locking means 80 may be a metallic nut-like member, formed of brass, aluminum, or other suitable material, and it has first and second inner diameters 92 and 94, respectively. The wall section of locking means 80 adjacent the first inner diameter 92 is relatively thin, and may be slotted as shown at 96 in FIG. 1, which allows it to flex inwardly when urged by clamping means 86. Clamping means 86, which may be similar in construction to the conventional hose-type clamp, may thus secure locking means 80 to cable 70, once plug-in portion 14 is disposed in assembled relation with insulator portion 12. The first inner diameter 92, thus has a diameter which is substantially the same as the outside diameter of cable 70, including the semiconductive resilient sleeve member 84, as locking means 80 is disposed immediately adjacent the location of semiconductive resilient sleeve member 84.

The second inner diameter 94 of locking means 80 is threaded, and has an inner diameter which cooperates with the outer threaded diameter of tubular metallic means 50, to allow locking means 80 to be threadedly engaged with tubular metallic means 50.

Gasket means 82 is disposed over resilient sleeve member 84, immediately adjacent the shoulder formed by the change from the first to the second inner diameters 92 and 94, respectively, on locking means 80. Thus, when locking means 80 is threadably engaged with tubular metallic means 50 end 54 of tubular metallic means 50 will compress gasket means 82 against the shoulder portion of the locking means, causing it to press tightly against resilient sleeve member 84 and provide a moisture seal.

Thus, to provide a simple but highly effective waterproof termination of a high voltage shielded and grounded cable at electrical apparatus, having an insulator portion 12 associated therewith, the field personnel may prepare the plug-in portion 14 by removing a predetermined length of the outer jacket or shield 76 of the high voltage cable 70, remove a shorter predetermined length of semiconductor material 78 from the cable 70, if it is used, and remove a predetermined length of insulation 74 from the cable end. Electrical contact 88 may then be telescoped over the bared electrical conductor 72 and crimped thereto, resilient sleeve member 84 may be telescoped over the cable into position adjacent the termination of outer jacket 76 and semiconductive material 78, locking means 80, with clamping means 86 in place adjacent its first diameter, may be telescoped over the cable adjacent resilient sleeve member 84, with the second inner diameter of locking means 80 being closer to electrical contact 88 than its first inner diameter, and gasket means 82 may then be telescoped over the cable 70 adjacent the start of the first inner diameter of locking means 80. The plug-in portion 14 is then complete, and ready to be plugged into insulator portion 12.

Before inserting plug-in portion 14 onto insulator portion 12, a measured amount of insulating oil or other suitable fluid dielectric, should be disposed in the orifice or opening 36. This will insure that the air in orifice 36 will be forced out when plug-in portion 14 is inserted into the orifice.

After the fluid dielectric has been disposed in the orifice, plug-in portion 14 may then be inserted into the insulating portion with an axial motion, until the fingers 40 on electrical terminal means 34 snap into annular groove 90 on electrical contact 88. Locking means 80, which may have a nut-like outer configuration adjacent its second inner diameter 94, may then be turned to threadably engage locking means 80 with tubular metallic means 50. Locking means 80 is turned until gasket means 82 is compressed, which provides a moisture seal, and also connects cable jacket 76 and semiconductive layer 78 to the stress control portion of tubular metallic means 50, through resilient sleeve member 84. Locking means 80 also securely mounts plug-in portion 14 relative to insulator portion 12. Clamping means 86 may then be tightened to urge the portion of locking means 80 adjacent the first inner diameter 92 firmly against resilient sleeve member 84 and against cable 70, to insure a moisture seal between the resilient sleeve member and the cable, and to firmly anchor cable 70 relative to the locking means. Thus, cable 70 cannot be accidentally pulled out of locking means 80, once it is in assembled relation with insulator means 12 and clamping means 86 has been tightened. Clamping means 86 also insures that the connection will be maintained under short circuit conditions.

Insulator portion 12, while allowing high voltage shielded cable 70 to be used directly as a portion of the plug-in portion, may be readily adapted to use a conventional plug-in elbow connector, if desired. For example, FIG. 5 illustrates adapter means 100 which may be inserted into insulator portion 12, to enable an elbow type connector 102, shown in phantom, to be used.

Adapter 100 may include an inner electrical conductor 104, cast within insulating body portion 106, the latter being formed of an epoxy resin system, or other suitable resin system. End 110 of conductor 104 may include a contact 108, which may be similar to contact 88, and end 112 of conductor 104 may be tubular and slotted, to receive the depending electrically conductive portion 114 of elbow connector 102. Resilient means 116 may be cast into adapter 100, adjacent tubular end 112 of conductor 104, to allow the slotted tubular end to flex slightly and thus provide a positive pressure against conductor 114.

A metallic nut, or a threaded metallic ring 118, may be cast into adapter 100, to provide electrically conductive mounting means which cooperates with the threaded end of tubular metallic means 50, to secure adapter 100 in assembled relation with insulator portion 12.

A metallic coating 120, such as aluminum, may be disposed on insulating body portion 106, starting at the electrically conductive mounting means 118 and extending to a point on the adapter 100 which will make contact with the outer electrically conductive layer on elbow connector 102, to continue the cable ground through the elbow connector 102 to the stress control portion of tubular metallic means 50.

In summary, there has been disclosed a new and improved terminal for terminating high voltage shielded cable, and for connecting the cable to electrical apparatus, which eliminates the requirement of separate stress cones and potheads for terminating the cable shield, and separate insulating bushings for taking the electrical conductor of the cable through the wall of the casing. The disclosed high voltage terminal construction combines these functions into one assembly, which not only provides a completely waterproof electrical connection which would allow the electrical apparatus to operate even while flooded, but provides a termination which allows unskilled personnel to construct in the field, using the high voltage shielded cable itself to form the plug-in connector portion of the terminal. Further, the disclosed construction combines several functions into single elements, which greatly simplifies the structure and reduces the cost of the assembly. For example, tubular metallic means 50 provides the functions of cooperating with the mounting means of the plug-in portion 14, providing stress control means for terminating the grounded cable shield, providing probe contact means for determining if the cable is energized, and providing a shoulder which cooperates with a mating shoulder on plug-in portion 14, to compress a gasket and seal the electrical connection against moisture. Another example is the metallic mounting or locking means 80, which provides the functions of mounting the plug-in portion 14 in assembled relation with insulator portion 12, cooperating with insulator portion 12 to compress a gasket to form a moisture seal, and cooperating with clamping means 86 to secure the cable. Still another example is the resilient sleeve member 84, which connects the cable shield with the stress control portion of tubular metallic means 50. The resilient sleeve member 84, if formed of semiconductive material, aids in reducing electrical stress at the shield termination by automatically assuming the proper resisitivity for the magnitude of the potential, it electrically connects the cable shield to the stress cone portion of member 50, it provides a low impedance which keeps tubular metallic means 50 slightly above ground to allow it to be used as an electrostatic device and therefore as a probe contact, it provides resilient means for clamping means 86 to compress locking means 80 against, and thus firmly grip cable 70, and, by making the resilient sleeve member available in different wall thicknesses, it will allow cable termination 10 to be adapted to a plurality of different cable sizes.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A plug-in type terminal for receiving a shielded cable termination which has inner and outer concentrically disposed electrically conductive portions, comprising: an insulator portion formed of a cast resinous material, said insulator portion having means adapted for mounting said insulator portion in fixed relation through an opening in the casing of electrical apparatus, said insulator portion having first and second ends, and an orifice which extends between its ends; electrical terminal means disposed at the first end of said insulator portion which seals the opening to the orifice at this end, said electrical terminal means having a first end accessible through the orifice which is adapted for plug-in contact with the inner electrically conductive portion of the shielded cable termination, and a second end accesible external to said insulator portion which is adapted for connection with an electrical conductor within the casing of the electrical apparatus; a tubular metallic member disposed adjacent the second end of said insulator portion, said tubular metallic member having a first end which extends outwardly from the second end of said insulator portion, and which is adapted to cooperate with the shielded cable termination to secure the shielded cable termination in assembled relation with said insulator portion, and a second end which is embedded in the cast resinous material of said insulator portion, and which flares outwardly within the cast resinous material to provide a stress cone termination for the outer electrically conductive portion of the shielded cable termination; a resilient sleeve member; and shielded cable mounting means; said resilient sleeve member being disposed at least partially within the opening at the first end of said tubular metallic member, with the adjacent inner and outer surfaces of said tubular metallic member and said resilient sleeve member, respectively, being in contact with one another; said shielded cable mounting means having means for removably engaging the first end of said tubular metallic member, and means disposed adjacent to and contacting at least a portion of said resilient sleeve member; said resilient sleeve member having an inner diameter adapted to receive a shielded electrical cable in a close fitting manner, to contact at least a portion of the outer electrically conductive portion of the shielded cable; said resilient sleeve member being at least partially electrically conductive to connect the outer electrically conductive portion of the shielded cable to said tubular metallic member.

2. The plug-in terminal of claim 1 wherein said resilient sleeve member has a voltage dependent resistivity.

3. The plug-in terminal of claim 1 wherein the second portion of said shielded cable mounting means has clamping means adapted to secure said shielded cable mounting means to the shielded electrical cable.

4. The plug-in terminal of claim 3 including a shielded cable having an inner electrical conductor which is exposed for a predetermined length at one end thereof and an outer electrical conductor, said shielded cable being disposed through said shielded cable mounting means and through said resilient sleeve member, extending into the orifice defined by said insulator portion, the exposed end of said inner electrical conductor being in plug-in contact with the first portion of said electrical terminal means, the outer electrical conductor being in contact with said resilient sleeve member, and the clamping means of the second portion of said shielded cable mounting means providing a sealed mechanical connection between said shielded cable mounting means and said shielded cable.

5. The plug-in terminal of claim 3 including gasket means disposed between and compressed by the first portion of said tubular metallic means and said shielded cable mounting means, said compressed gasket means pressing against the outer surface of said resilient sleeve member to form a moisture seal.

6. The plug-in type terminal of claim 4 including probe contact means electrically connected to said tubular metallic means, said probe contact means being accessible at the outer surface of said insulator portion, the second portion of said tubular metallic means being spaced from the inner conductor of said shielded cable, said resilient sleeve member providing an impedance which enables said tubular metallic means to develop a potential electrostatically when the inner conductor of the shielded cable is energized.

7. A plug-in type terminal comprising: an insulator portion formed of a cast resinous material, said insulator portion having means adapted for mounting said insulator portion in fixed relation through an opening in the casing of electrical apparatus, said insulator portion having first and second ends, and an orifice which extends between its ends; electrical terminal means disposed at the first end of said insulator portion which seals the opening to the orifice at this end, said electrical terminal means having a first end accessible through the orifice which is adapted for plug-in contact with the inner electrically conductive portion of the shielded cable termination and a second end accessible external to said insulator portion which is adapted for connection with an electrical conductor within the casing of the electrical apparatus; a tubular metallic member disposed adjacent the second end of said insulator portion, said tubular metallic member having a first end which extends outwardly from the second end of said insulator portion, and which is adapted to cooperate with the shielded cable termination to secure the shielded cable termination in assembled relation with said insulator portion, and a second end which is embedded in the cast resinous material of said insulator portion, and which flares outwardly within the cast resinous material to provide a stress cone termination for the outer electrically conductive portion of the shielded cable termination; and adapter means which enables the plug-in terminal to receive an elbow-type plug-in shielded cable termination which has a depending inner electrical conductor surrounded in spaced relation by a hollow tubular cylindrical member the outer surface of which is an electrical conductor; said adapter means including an inner electrically conductive member having first and second ends, the first end of said inner electrically conductive member defining an opening for receiving the depending inner electrical conductor of the elbow connector, the second end of the inner electrically conductive member being adapted for plug-in connection with the first end of said electrical terminal means; an insulating body portion disposed to surround said inner electrically conductive member in a tight fitting manner starting at its first end and terminating a predetermined distance from its second end; said insulating body portion having electrically conductive mounting means disposed intermediate the ends of the inner electrically conductive member, which is adapted to cooperate with the first end of said tubular metallic member to secure said adapter means in removable relation with said insulator portion; said insulating body portion adjacent the first end of the inner electrically conductive member extending outwardly from said insulator portion when assembled therewith, for receiving the tubular cylindrical member of the elbow-type connector; and electrically conductive means disposed at least on the outer surface of a predetermined portion of said insulating body portion which extends from the electrically conductive mounting means to a point on said insulating body portion which will make contact with the outer electrically conductive surface of the elbow-type connector when it is in assembled relation with said adapter means.

References Cited

UNITED STATES PATENTS

| | | | |
|---|---|---|---|
| 2,396,283 | 3/1946 | Papst | 174—75 |
| 2,789,154 | 4/1957 | Peterson | 174—73.1 |
| 2,967,901 | 1/1961 | Priaroggia | 174—73 |
| 3,018,318 | 1/1962 | Franklin | 339—143 |
| 3,141,061 | 7/1964 | Bianco et al. | 174—19 X |
| 3,307,137 | 2/1967 | Tordoff et al. | 174—75 X |
| 3,322,883 | 5/1967 | Lusk | 174—19 X |

FOREIGN PATENTS

| | | |
|---|---|---|
| 1,051,353 | 2/1959 | Germany. |

RICHARD E. MOORE, Primary Examiner

U.S. Cl. X.R.

339—177